(12) United States Patent
Fujii

(10) Patent No.: US 7,844,173 B2
(45) Date of Patent: Nov. 30, 2010

(54) IMAGE CAPTURING APPARATUS

(75) Inventor: Shinichi Fujii, Osaka (JP)

(73) Assignee: Sony Corporation, Tokyo (JP)

( * ) Notice: Subject to any disclaimer, the term of this patent is extended or adjusted under 35 U.S.C. 154(b) by 86 days.

(21) Appl. No.: 12/210,560

(22) Filed: Sep. 15, 2008

(65) Prior Publication Data

US 2009/0110382 A1   Apr. 30, 2009

(30) Foreign Application Priority Data

Oct. 26, 2007   (JP)  ............... 2007-278719

(51) Int. Cl.
*G03B 3/00*   (2006.01)
(52) U.S. Cl. .................................... 396/121
(58) Field of Classification Search ............... 396/121, 396/128, 147
See application file for complete search history.

(56) References Cited

U.S. PATENT DOCUMENTS

| | | | | |
|---|---|---|---|---|
| 6,097,893 | A * | 8/2000 | Nakano | 396/51 |
| 6,157,782 | A * | 12/2000 | Aoyama | 396/104 |
| 6,512,888 | B2 * | 1/2003 | Aoyama | 396/121 |
| 2006/0127080 | A1 * | 6/2006 | Mori et al. | 396/121 |
| 2007/0122137 | A1 * | 5/2007 | Ohnishi | 396/123 |
| 2007/0206940 | A1 * | 9/2007 | Kusaka | 396/128 |
| 2008/0118238 | A1 | 5/2008 | Sogawa et al. | |
| 2008/0145043 | A1 * | 6/2008 | Katayama et al. | 396/125 |
| 2008/0170152 | A1 | 7/2008 | Fujii | |
| 2008/0259202 | A1 | 10/2008 | Fujii | |

FOREIGN PATENT DOCUMENTS

JP   2006-251065   9/2006

OTHER PUBLICATIONS

U.S. Appl. No. 11/908,324, filed Sep. 11, 2007, Fujii et al.
U.S. Appl. No. 12/197,662, filed Aug. 25, 2008, Ono, et al.
U.S. Appl. No. 12/210,589, filed Sep. 15, 2008, Fujii.
U.S. Appl. No. 12/240,203, filed Sep. 29, 2008, Fujii.

* cited by examiner

*Primary Examiner*—W. B. Perkey
*Assistant Examiner*—Dennis Hancock
(74) *Attorney, Agent, or Firm*—Oblon, Spivak, McClelland, Maier & Neustadt, L.L.P.

(57) ABSTRACT

An image capturing apparatus includes an image sensing device that receives object light and generates an image signal relating to the object image, a phase difference detection unit that receives the object light using a ranging sensor and generates a phase difference detection signal, a first focusing unit for performing a first focusing operation on the basis of the phase difference detection signal, and a display controlling unit for displaying a preview image on the basis of a plurality of image signals sequentially generated by the image sensing device before an image is actually recorded. The display controlling unit combines a first area for which the phase difference detection is performed using the ranging sensor and the preview image so as to display the combined image.

3 Claims, 12 Drawing Sheets

IMAGE CAPTURING APPARATUS

CROSS REFERENCES TO RELATED APPLICATIONS

The present invention contains subject matter related to Japanese Patent Application JP 2007-278719 filed in the Japanese Patent Office on Oct. 26, 2007, the entire contents of which are incorporated herein by reference.

BACKGROUND OF THE INVENTION

1. Field of the Invention

The present invention relates to an image capturing apparatus having an optical viewfinder function and an electronic viewfinder function.

2. Description of the Related Art

In general, users of single-lens reflex digital cameras use an optical viewfinder in order to monitor an object of shooting. However, some single-lens reflex digital cameras have an electronic viewfinder function of displaying an object on a monitor in a moving manner (refer to, for example, Japanese Unexamined Patent Application Publication No. 2006-251065).

Japanese Unexamined Patent Application Publication No. 2006-251065 describes the following technology. Autofocus (AF) control is performed using a contrast detection method while a user is composing a shot using an electronic viewfinder with a mirror staying in the up position (in an electronic viewfinder mode), and AF control is performed using a phase difference detection method while a user is composing a shot using an optical viewfinder with the mirror staying in the down position (in an optical viewfinder mode).

In general, in AF control using a phase difference detection method with the mirror staying in the down position, a phase difference AF module including an exposure metering sensor, such as a line sensor, is used. However, theoretically, it is difficult for a phase difference AF module to support a large number of AF areas. In contrast, AF control using a contrast detection method can set a large number of AF areas in an imaging surface.

SUMMARY OF THE INVENTION

Accordingly, in the technology described in Japanese Unexamined Patent Application Publication No. 2006-251065, if the viewfinder mode is changed from an electronic viewfinder mode to an optical viewfinder mode after an AF area used for focusing (hereinafter also referred to as an "AF target area") is determined during composing of a shot in an electronic viewfinder mode, an AF area used for AF control using a phase difference detection method may not be located in the AF target area. In such a case, a user adjusts the angle of view again, and therefore, the operation becomes troublesome.

Accordingly, the present invention provides an image capturing apparatus that does not force a user to adjust the angle of view again when AF control using a phase difference detection method is performed after an electronic viewfinder mode is used.

According to an embodiment of the present invention, an image capturing apparatus includes an image sensing device configured to receive object light and generate an image signal relating to an object image, a phase difference detection unit configured to receive the object light using a ranging sensor and generate a phase difference detection signal, first focusing means for performing a first focusing operation on the basis of the phase difference detection signal, and display controlling means for displaying a preview image on the basis of a plurality of image signals sequentially generated by the image sensing device before the object image is actually recorded. The display controlling means combines a first area for which the phase difference detection is performed using the ranging sensor with the preview image and displays the combined image.

According to another embodiment of the present invention, an image capturing apparatus includes an image sensing device configured to receive object light made incident from an imaging optical system and generate an image signal relating to an object image, a mirror unit disposed on an optical axis of the object light, where the mirror unit changes an optical path of the object light, a phase difference detection unit configured to receive the object light having the optical path changed by the mirror unit using a ranging sensor and generate a phase difference detection signal, first focusing means for performing a first focusing operation on the basis of the phase difference detection signal, mirror controlling means for moving the mirror unit away from the optical path, and display controlling means for displaying a preview image on the basis of a plurality of image signals sequentially generated by the image sensing device before an image is actually recorded with the mirror unit moved away from the optical path. The display controlling means displays a first area for which the phase difference detection is performed using the ranging sensor when the preview image is displayed.

According to the embodiment of the present invention, a first area for which phase difference detection is performed using a ranging sensor of the phase difference detection unit is combined with a preview image and is displayed. Accordingly, when the first focusing operation is performed on the basis of a phase difference detection signal generated by the ranging sensor, re-alignment of the angle of view is not necessary.

DESCRIPTION OF THE PREFERRED EMBODIMENTS

First Embodiment

External Structure of Image Capturing Apparatus 1A

Figure 1:
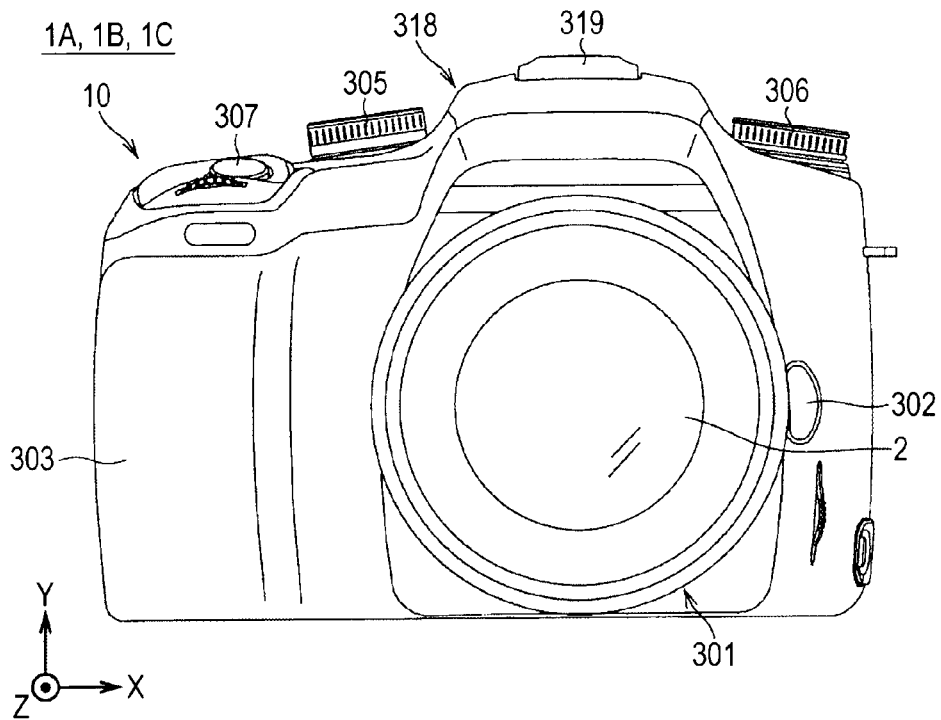
FIG. 1 illustrates an exemplary external structure of an image capturing apparatus according to a first embodiment of the present invention.
Figure 2:
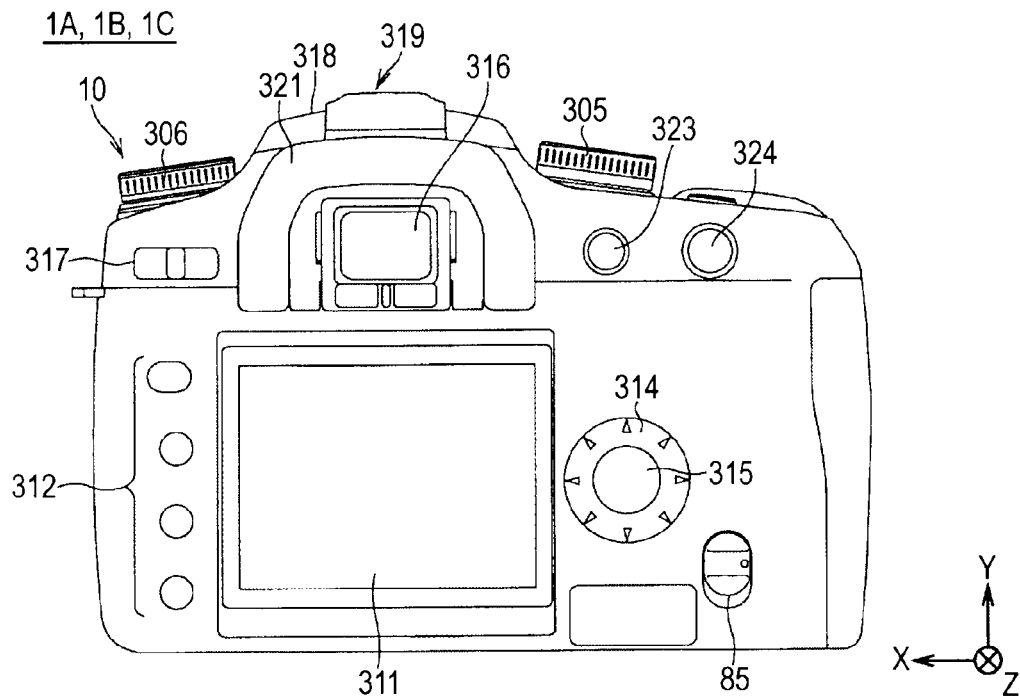
FIG. 2 illustrates an exemplary external structure of an image capturing apparatus according to the first embodiment of the present invention.

FIGS. 1 and 2 illustrate an exemplary external structure of an image capturing apparatus 1A according to a first embodiment of the present invention. More specifically, FIGS. 1 and 2 are a front view and a back view of the image capturing apparatus 1A, respectively.

For example, the image capturing apparatus 1A has the configuration of a single-lens reflex digital still camera. The image capturing apparatus 1A includes a camera body 10 and an interchangeable lens 2 removably mounted on the camera body 10.

More specifically, as shown in FIG. 1, the front surface of the camera body 10 includes a mount unit 301 on which the interchangeable lens 2 is mounted at substantially the center of the front surface, a lens release button 302 disposed on the right of the mount unit 301, a grip unit 303 for allowing the user to hold the camera body 10, a mode setting dial 305 disposed on the upper left surface of the camera body 10, a control value setting dial 306 disposed on the upper right surface of the camera body 10, and a shutter button 307 disposed on the top surface of the grip unit 303.

The interchangeable lens 2 functions as a lens window that receives light (object light) output from an object of shooting and also functions as an imaging optical system that leads the object light to an image sensing device 101 disposed inside the camera body 10.

Figure 5:
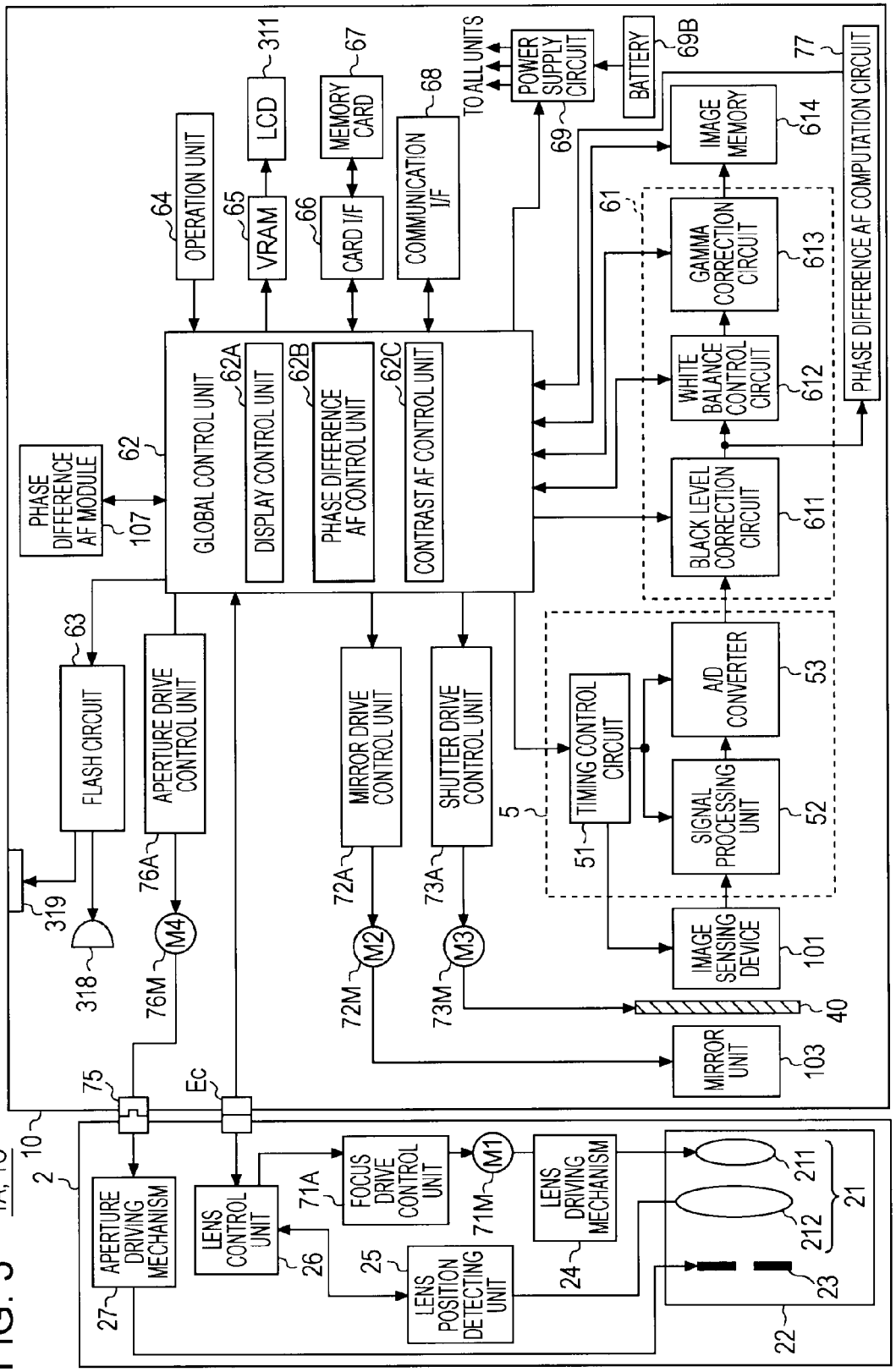
FIG. 5 is a block diagram of an exemplary electrical configuration of the image capturing apparatus.

More specifically, the interchangeable lens 2 includes a lens unit 21 having a plurality of lenses disposed along an optical axis LT in a line (refer to FIG. 5). The lens unit 21 includes a focus lens 211 used for controlling a focal point (refer to FIG. 5) and a zoom lens 212 used for variable magnification (refer to FIG. 5). The focus lens 211 and the zoom lens 212 are driven along the optical axis LT (refer to FIG. 3) so that focus control and variable magnification are performed, respectively. The interchangeable lens 2 further includes an operation ring disposed at an appropriate location on the peripheral surface so as to be rotatable along the peripheral surface of a lens barrel. Through a manual operation or automated operation, the zoom lens 212 is moved along the optical axis direction by a distance in accordance with the rotational direction and the amount of rotation of the operation ring. Thus, the zoom ratio (the magnification ratio) can be determined in accordance with the position to which the zoom lens 212 is moved.

The mount unit 301 includes a connector Ec used for electrically connecting the camera body 10 to the mounted interchangeable lens 2 (refer to FIG. 5) and a coupler 75 used for mechanically connecting the camera body 10 to the interchangeable lens 2 (refer to FIG. 5).

The lens release button 302 is pressed in order to remove the interchangeable lens 2 mounted on the mount unit 301.

The grip unit 303 is used for a photographer (user) to hold the image capturing apparatus 1A while the user is capturing an image. Irregularities are formed on the surface of the grip unit 303 so as to fit snugly around the fingers of the user. In addition, a battery container and a card container (neither is shown) are provided inside the grip unit 303. The battery container can contain a battery 69B (refer to FIG. 5) serving as a power supply of the image capturing apparatus 1A. The card container can removably hold a memory card 67 that stores image data of a captured image. The grip unit 303 may include a grip sensor in order to detect whether the user grips the grip unit 303 or not.

The mode setting dial 305 and the control value setting dial 306 are members having substantially a disk shape. Each of the mode setting dial 305 and the control value setting dial 306 is rotatable in a plane substantially parallel to the top surface of the camera body 10. The mode setting dial 305 is used for selecting one of various modes (e.g., a shooting mode, a playback mode, and a communication mode) of the image capturing apparatus 1A. Examples of a sub-shooting mode include a portrait mode, a landscape mode, and a full-auto shooting mode. In the playback mode, a captured image is played back. In the communication mode, data is communicated with an external apparatus. In contrast, the control value setting dial 306 is used for setting control values of a variety of functions of the image capturing apparatus 1A.

The shutter button 307 is a press button that allows a user to press the button halfway down and to further press the button fully down. In a shooting mode, when the shutter button 307 is pressed halfway down (S1), a standby operation for capturing a still image of an object (e.g., setting of an exposure control value and controlling the focus) is performed. When the shutter button 307 is pressed fully down (S2), an image capturing operation is performed. In the image capturing operation, the image sensing device 101 (refer to FIG. 3) is exposed to imaging light. Subsequently, an image signal obtained through the exposure is subjected to predetermined image processing, and the image signal is stored in, for example, a memory card.

As shown in FIG. 2, the camera body 10 includes the following on the back surface thereof: a liquid crystal display (LCD) 311 serving as a display unit, a finder window 316 disposed on the upper side of the LCD 311, an eyecup 321 surrounding the finder window 316, a main switch 317 disposed to the left of the finder window 316, an exposure correction button 323 and an AE lock button 324 disposed to the right of the finder window 316, and a flash unit 318 and a connection terminal unit 319 disposed on the upper side of the finder window 316. Furthermore, the camera body 10 includes the following on the back surface thereof: a setting button group 312 disposed to the left of the LCD 311, a directional arrow pad 314 disposed to the right of the LCD 311, a push button 315 disposed at the center of the directional arrow pad 314, and a display changeover switch 85 disposed to the lower right of the directional arrow pad 314.

The LCD 311 includes a color liquid crystal panel capable of displaying an image. The LCD 311 plays back and displays an image captured by the image sensing device 101 (refer to FIG. 3) or a recorded image. In addition, the LCD 311 displays screens used for setting the functions and the modes of the image capturing apparatus 1A. An organic electroluminescent (EL) display or a plasma display may be employed in place of the LCD 311.

The finder window (eyepiece window) 316 forms an optical viewfinder (OVF). Light (object light) that has passed through the interchangeable lens 2 is lead to the finder window 316 so as to form an object image. By viewing the image through the finder window 316, the user can monitor the object image to be actually captured by the image sensing device 101.

The main switch 317 is a dual contact slide switch that slides in a horizontal direction. When the main switch 317 is set to the left, the image capturing apparatus 1A is powered on. In contrast, when the main switch 317 is set to the right, the image capturing apparatus 1A is powered off.

The flash unit 318 serves as a pop-up internal flash unit. When an external flash unit is mounted on the camera body 10, the external flash unit is connected using the connection terminal unit 319.

The eyecup 321 is a U-shaped light blocking member that blocks external light from entering the camera body 10 through the finder window 316.

The exposure correction button 323 is used for manually controlling an exposure value (an aperture value and a shutter speed value). The AE lock button 324 is used for fixing the exposure value.

The setting button group 312 includes buttons for controlling a variety of functions of the image capturing apparatus 1A. Examples of the buttons in the setting button group 312 include a menu button used for displaying, for example, a menu screen on the LCD 311 and a menu selection button used for changing menu screens.

The directional arrow pad 314 includes a ring-shaped member having a plurality of circumferentially equiangularly spaced press portions (indicated by triangle marks in the drawing) thereon. A contact point (switch) (not shown) provided to each of the press portions can detect the pressing operation of the press portion. The push button 315 is disposed at the center of the directional arrow pad 314. The directional arrow pad 314 and the push button 315 are used for inputting instructions regarding a change in a magnifying factor of a captured image (i.e., moving the zoom lens 212 (refer to FIG. 5) towards the wide-angle end or a telephoto end), frame advance of recorded images played back on the LCD 311, and setting of shooting conditions (an aperture value, a shutter speed, and flash lighting).

The display changeover switch 85 is a dual contact slide switch. When the display changeover switch 85 is set to an upper position "Optical", an optical viewfinder mode (hereinafter also referred to as an "OVF mode") is selected. Thus, an object image is displayed in the optical viewfinder. In this way, by viewing an object image displayed in the optical viewfinder through the finder window 316, the user can compose a shot (perform framing).

In contrast, when the display changeover switch 85 is set to a lower position "Monitor", an electronic viewfinder mode (hereinafter also referred to as an "EVF mode" or a "live view" mode) is selected. Thus, an object image is displayed on the LCD 311 in a moving manner. In this way, by viewing a live view image displayed on the LCD 311, the user can perform framing.

As described above, by operating the display changeover switch 85, the user can switch between the two viewfinder modes. For the image capturing apparatus 1A, the user can perform framing using the electronic viewfinder that provides a live view display or using the optical viewfinder.

Internal Configuration of Image Capturing Apparatus 1A

Figure 3:
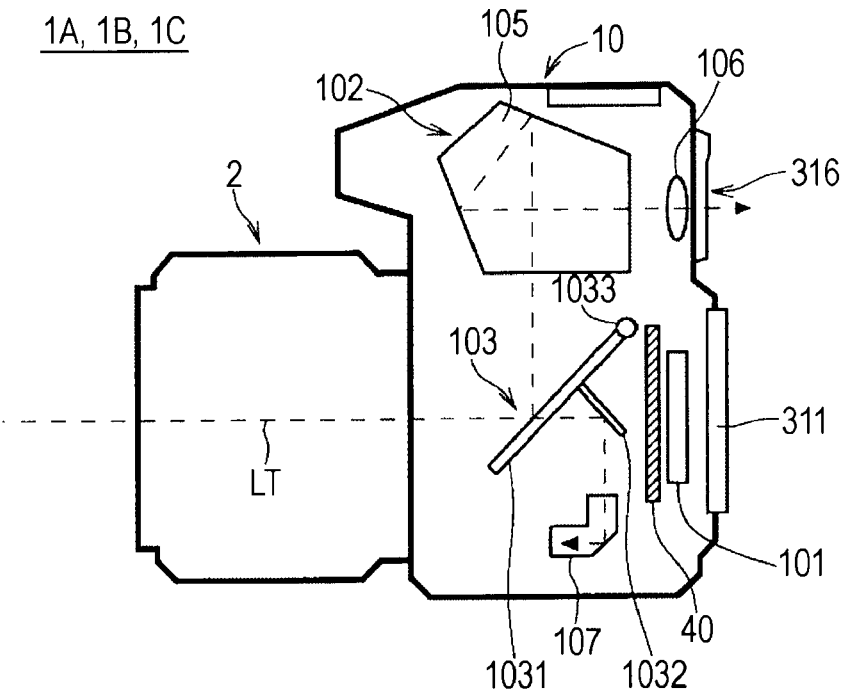
FIG. 3 is a longitudinal sectional view of the image capturing apparatus.
Figure 4:
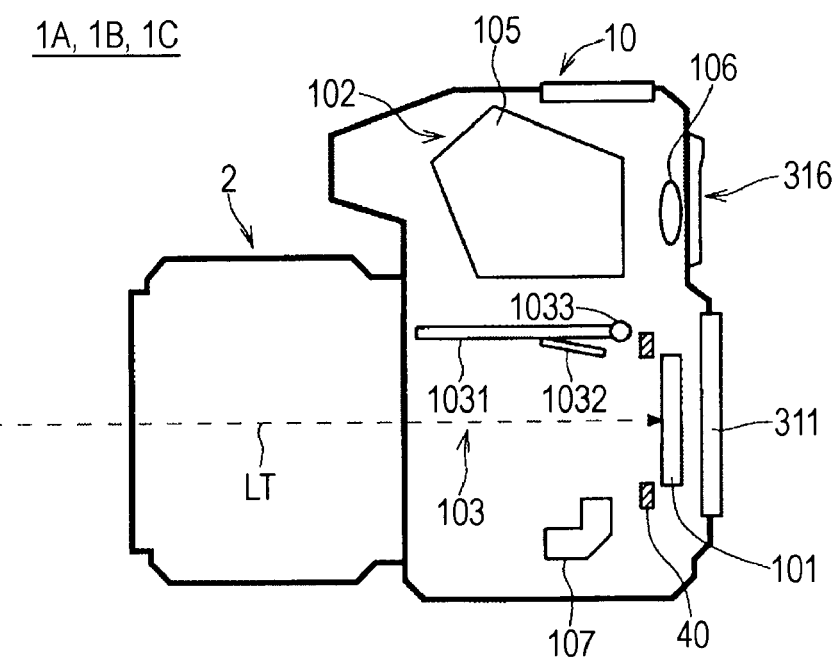
FIG. 4 is a longitudinal sectional view of the image capturing apparatus.

An exemplary internal configuration of the image capturing apparatus 1A is described next. FIGS. 3 and 4 are longitudinal sectional views of the image capturing apparatus 1A. As shown in FIG. 3, the camera body 10 primarily incorporates the image sensing device 101, a finder unit 102 (a viewfinder optical system), a mirror unit 103, and a phase difference AF module (also simply referred to as an "AF module") 107.

The image sensing device 101 is disposed on the optical axis LT of the lens unit 21 of the interchangeable lens 2 so as to be perpendicular to the optical axis LT when the interchangeable lens 2 is mounted on the camera body 10. For example, a complementary metal-oxide semiconductor (CMOS) color area sensor (a CMOS image sensing device) including a plurality of pixels two-dimensionally arranged in a matrix each including a photodiode is used for the image sensing device 101. The image sensing device 101 generates analog electrical signals (image signals) of R (red), G (green), and B (blue) components of an object image formed through the interchangeable lens 2. The system control unit 101 then outputs the image signals of R (red), G (green), and B (blue) color components.

In addition, the image sensing device 101 includes a light-receiving element for phase difference detection on the imaging surface thereof. The light-receiving element is described in more detail below.

The mirror unit 103 is disposed at a position on the optical axis LT at which the object light is reflected towards the finder unit 102. The object light passes through the interchangeable lens 2. Thereafter, the object light is reflected upwards by the mirror unit 103 (a main mirror 1031 described below). In addition, the object light partially passes through the mirror unit 103.

The finder unit 102 includes a pentaprism 105, an eyepiece lens 106, and a finder window 316. The pentaprism 105 has a pentagonal cross section. By reflecting an object image made incident on a lower surface therein, the pentaprism 105 changes the orientations of the optical image in the vertical and horizontal directions so as to provide an upright image. The finder unit 102 having such a structure functions as an optical viewfinder used by the user to frame images before an image is actually captured.

The mirror unit 103 includes the main mirror 1031 and a sub-mirror 1032. The sub-mirror 1032 is disposed on the back side of the main mirror 1031. The sub-mirror 1032 is pivotable so as to be tilted towards the back surface of the main mirror 1031. Part of the object light that has passed through the main mirror 1031 is reflected by the sub-mirror 1032. The reflected light is made incident on the AF module 107.

The mirror unit 103 functions as a so-called "quick return mirror". For example, during exposure (when an image is actually captured) (refer to FIG. 4), the mirror unit 103 rotates about a rotation shaft 1033 and pops up. Thus, the mirror unit 103 enters a state in which the mirror unit 103 is moved away from the optical axis of the object light (a mirror lock-up mode). At that time, when the mirror unit 103 stops at a position beneath the pentaprism 105, the sub-mirror 1032 is folded so as to be substantially parallel to the main mirror 1031. Thus, the object light that has passed through the interchangeable lens 2 is not blocked by the mirror unit 103 and reaches the image sensing device 101. Therefore, the image sensing device 101 is exposed to the object light. When the image capturing operation performed by the image sensing device 101 is completed, the mirror unit 103 returns to an original position (a position shown in FIG. 3) and enters a mirror lock-down mode.

In addition, by causing the mirror unit 103 to enter the mirror lock-up mode before an image is actually captured (before an image is captured for recording), the image capturing apparatus 1A can display a live view (preview) using the image signals sequentially generated by the image sensing device 101 so that an object is displayed on the LCD 311 in the form of a moving image.

The AF module 107 is formed from a so-called AF sensor including a ranging element (also referred to as a "ranging sensor") for detecting focus information about the object. The AF module 107 is disposed on the bottom surface of the mirror unit 103. The AF module 107 has a phase difference detection function of generating a phase difference detection signal in accordance with the level of the focus of the object image. That is, when the user observes an object through the finder window 316 before the image is actually captured, the main mirror 1031 and the sub-mirror 1032 are inclined, as shown in FIG. 3. Thus, the object light is led to the AF module 107, which outputs a phase difference detection signal.

A shutter unit 40 is disposed in front of the image sensing device 101 in the optical axis direction. The shutter unit 40 includes a curtain movable in the vertical direction. The shutter unit 40 functions as a mechanical focal plane shutter that opens and blocks the optical path of the object light led to the image sensing device 101 along the optical axis LT. If the image sensing device 101 is an image sensing device that can serve as a complete electronic shutter, the necessity for the shutter unit 40 can be avoided.

Electrical Configuration of Image Capturing Apparatus 1A

FIG. 5 is a block diagram of an exemplary electrical configuration of the image capturing apparatus 1A. Similar numbering will be used in describing FIG. 5 as was utilized above in describing FIGS. 1 to 4. For ease of description, an exemplary electrical configuration of the interchangeable lens 2 is described first.

In addition to the lens unit 21 of the above-described imaging optical system, the interchangeable lens 2 includes a lens driving mechanism 24, a lens position detecting unit 25, a lens control unit 26, and an aperture driving mechanism 27.

In the lens unit 21, the focus lens 211, the zoom lens 212, an aperture 23 for controlling an amount of light made incident on the image sensing device 101 are disposed in the lens barrel along a direction of the optical axis LT (refer to FIG. 3). Thus, an image is formed on the image sensing device 101 by the object light collected by the lens unit 21. In the autofocus (AF) control, an AF actuator 71M disposed in the interchangeable lens 2 moves the focus lens 211 along the direction of the optical axis LT so that the focus is controlled.

A focus drive control unit 71A generates a drive control signal used for moving a focal position of the focus lens 211 on the basis of the AF control signal provided from a global control unit 62 via the lens control unit 26. Thus, the focus drive control unit 71A controls the AF actuator 71M using the generated drive control signal. For example, the AF actuator 71M includes a stepping motor. The AF actuator 71M provides the lens driving mechanism 24 with a lens driving force.

The lens driving mechanism 24 includes, for example, a helicoid and gears (not shown) for rotating the helicoid. The lens driving mechanism 24 moves the focus lens 211 in a direction parallel to the optical axis LT using a driving force provided by the AF actuator 71M. The direction in which the focus lens 211 is moved and the amount of movement of the focus lens 211 are determined by the rotational direction and the number of revolutions of the AF actuator 71M.

The lens position detecting unit 25 includes an encode plate and an encoder brush. The encode plate has a plurality of encode patterns formed thereon at a predetermined pitch in the direction of the optical axis LT in a range in which the lens unit 21 is moved. The encoder brush is in slide contact with the encode plate and is moved along with the lens. The lens position detecting unit 25 detects the amount of movement of the lens unit 21 when focus is controlled. For example, the lens position detected by the lens driving mechanism 24 is output in the form of the number of pulses.

The lens control unit 26 includes a microcomputer incorporating a memory, such as a read-only memory (ROM) for storing a control program or a flash memory for storing data relating to status information.

In addition, the lens control unit 26 has a communication function of communicating data with the global control unit 62 of the camera body 10 via the connector Ec. Accordingly, for example, the lens control unit 26 can send, to the global control unit 62, state information, such as the focal length, the aperture value, the focusing distance of the lens unit 21, and the brightness of environment light, and the positional information about the focus lens 211 detected by the lens position detecting unit 25. Furthermore, the lens control unit 26 can receive data relating to the amount of driving of the focus lens 211 from the global control unit 62.

The aperture driving mechanism 27 is provided with a driving force from an aperture driving actuator 76M via the coupler 75 and changes the aperture diameter of the aperture 23.

An exemplary electrical configuration of the camera body 10 is described next. In addition to the above-described image sensing device 101 and the shutter unit 40, the camera body 10 includes an analog front end (AFE) 5, an image processing unit 61, an image memory 614, the global control unit 62, a flash circuit 63, an operation unit 64, a VRAM 65, a card I/F 66, a memory card 67, a communication I/F 68, a power supply circuit 69, a battery 69B, a mirror drive control unit 72A, a shutter drive control unit 73A, and an aperture drive control unit 76A.

As noted above, the image sensing device 101 is formed from a CMOS color area sensor. As described in more detail below, a timing control circuit 51 controls the image capturing operation performed by the image sensing device 101, such as start (and end) of exposure operation, selection of outputs from pixels included in the image sensing device 101, and readout of pixel signals.

The AFE 5 provides a timing pulse to the image sensing device 101 in order to cause the image sensing device 101 to perform a predetermined operation. In addition, the AFE 5 performs predetermined signal processing on an image signal output from the image sensing device 101 and converts the image signal to a digital signal. The AFE 5 then outputs the digital image signal to the image processing unit 61. The AFE 5 includes the timing control circuit 51, a signal processing unit 52, and an analog-to-digital (A/D) converter 53.

The timing control circuit 51 generates predetermined timing pulses (pulses for generating a vertical scanning pulse φVn, a horizontal scanning pulse φVm, and a reset signal φVr) on the basis of a reference clock output from the global control unit 62. The timing control circuit 51 then outputs the timing pulses to the image sensing device 101 so as to control the image capturing operation performed by the image sensing device 101. In addition, by outputting predetermined timing pulses to the signal processing unit 52 and the A/D converter 53, the timing control circuit 51 controls the operations of the signal processing unit 52 and the A/D converter 53.

The signal processing unit 52 performs predetermined analog signal processing on an analog image signal output from the image sensing device 101. The signal processing unit 52 includes a correlated double sampling (CDS) circuit, an auto gain control (AGS) circuit, and a clamping circuit. The A/D converter 53 converts each of analog R, G, and B image signals output from the signal processing unit 52 to a digital image signal represented by a plurality of bits (e.g., 12 bits) on the basis of the timing pulse output from the timing control circuit 51.

The image processing unit 61 performs predetermined signal processing on the image data output from the AFE 5 so as to generate an image file. The image processing unit 61 includes a black level correction circuit 611, a white balance control circuit 612, and a gamma correction circuit 613. The image data input to the image processing unit 61 is temporarily stored in the image memory 614 in synchronization with readout of the image sensing device 101. Subsequently, each block of the image processing unit 61 performs processing thereof while accessing the image data stored in the image memory 614.

The black level correction circuit 611 corrects the black level of each of the R, G, and B digital image signals A/D-converted by the A/D converter 53 so that the black level becomes a reference black level.

The white balance control circuit 612 converts the level of each of the digital signals of R, G, and B color components on the basis of reference white in accordance with the type of light source. That is, the white balance control circuit 612 performs white balance (WB) correction. More specifically, the white balance control circuit 612 identifies a portion that is estimated to be white in the object image using the brightness and saturation on the basis of the WB correction data provided from the global control unit 62. Subsequently, the white balance control circuit 612 then computes the average of each of the R, G, and B color components, the G/R ratio, and the G/B ratio in that portion. The white balance control circuit 612 performs level correction using these values for R and B correction gains.

The gamma correction circuit 613 corrects the gradation characteristic of the image data subjected to WB adjustment. More specifically, the gamma correction circuit 613 non-linearly converts the level of the image data for each of the color components and controls the offset using a pre-defined gamma correction table.

The image memory 614, in the shooting mode, temporarily stores the image data output from the image processing unit 61. In addition, the image memory 614 is used for a work area when the global control unit 62 performs predetermined processing on the image data. In the playback mode, the image memory 614 temporarily stores image data read out from the memory card 67.

The global control unit 62 is formed from a microcomputer. The global control unit 62 includes a central processing unit (CPU), a memory, and a ROM. The global control unit 62 reads out a program stored in the ROM and executes the program using the CPU. In this way, the global control unit 62 realizes the functions of the image capturing apparatus 1A.

By executing the above-described program, the global control unit 62 realizes the functions of a display control unit 62A, a phase difference AF control unit 62B, and a contrast AF control unit 62C.

The display control unit 62A controls information displayed on the LCD 311. For example, the display control unit 62A instructs the LCD 311 to sequentially display a plurality of images continuously captured by the image sensing device 101 in the form of a live view image.

In addition, the display control unit 62A combines an area Ef from which focusing information used for an AF operation is obtained (this area is also referred to as an "AF area", a "ranging area", or a "focus area") with a live view image and displays the combined image. This processing is described in more detail below.

The phase difference AF control unit 62B detects a focused position using a phase difference detection method so as to perform an autofocus operation. More specifically, the phase difference AF control unit 62B performs an in-focus lens position determination process in which the position (the in-focus lens position) of the lens (more specifically, the focus lens) is determined when the object is in focus on the basis of the phase difference detection signal acquired by the AF module 107 or a signal output from a phase difference AF computation circuit 77 (described below).

The contrast AF control unit 62C detects a focused position using a contrast detection method so as to perform an autofocus operation. This operation is also referred to as a "contrast AF operation". More specifically, the contrast AF control unit 62C performs an evaluation value computing process and an in-focus lens position determination process. In the evaluation value computing process, the contrast AF control unit 62C computes an evaluation value corresponding to the contrast of each of the object images in a plurality of images captured at different lens positions. In the in-focus lens position determination process, the contrast AF control unit 62C determines the lens position that optimizes (e.g., minimizes) the evaluation value to be the in-focus lens position.

The flash circuit 63, in a flash shooting mode, controls the amount of light emitted from an external flash connected to the flash unit 318 or the connection terminal unit 319 to the amount of light determined by the global control unit 62.

The operation unit 64 includes the above-described mode setting dial 305, control value setting dial 306, shutter button 307, setting button group 312, directional arrow pad 314, push button 315, and main switch 317. The operation unit 64 is used for inputting operational information to the global control unit 62.

The VRAM 65 has a storage capacity corresponding to the number of pixels of the LCD 311. The VRAM 65 serves as a buffer memory between the global control unit 62 and the LCD 311. The card I/F 66 serves as an interface that allows data communication between the memory card 67 and the global control unit 62. The memory card 67 is a recording medium for storing image data generated by the global control unit 62. The communication I/F 68 serves as an interface used for transmitting image data and the like to a personal computer or an external device.

The power supply circuit 69 is formed from, for example, a constant-voltage circuit. The power supply circuit 69 generates voltages for driving all components of image capturing apparatus 1A, such as the control unit (e.g., the global control unit 62), the image sensing device 101, and the other driving units. Power supply control of the image sensing device 101 is performed using a control signal supplied from the global control unit 62 to the power supply circuit 69. Examples of the battery 69B include a primary battery, such as an alkaline dry battery, and a secondary battery, such as a nickel hydride battery. The battery 69B serves as a power source for supplying power to the entire image capturing apparatus 1A.

The mirror drive control unit 72A generates a drive signal for driving a mirror driving actuator 72M when the viewfinder mode is switched or an image capturing operation is performed. The mirror driving actuator 72M rotates the mirror unit 103 (the quick return mirror) so as to be in a horizontal position or in a tilted position.

The shutter drive control unit 73A generates a drive control signal used for controlling a shutter driving actuator 73M on the basis of a control signal supplied from the global control unit 62. The shutter driving actuator 73M opens and closes the shutter unit 40.

The aperture drive control unit 76A generates a drive control signal used for controlling the aperture driving actuator 76M on the basis of a control signal supplied from the global control unit 62. The aperture driving actuator 76M supplies a driving force to the aperture driving mechanism 27 via the coupler 75.

In addition, the camera body 10 includes the phase difference AF computation circuit 77 for performing computation necessary for autofocus (AF) control on the basis of the image data having a corrected black level output from the black level correction circuit 611.

The phase difference AF operation using the output signal output from the phase difference AF computation circuit 77 is described in detail below. In addition, an AF operation that the image capturing apparatus 1A can perform is described.

AF Operation Performed by Image Capturing Apparatus 1A

Figure 6:
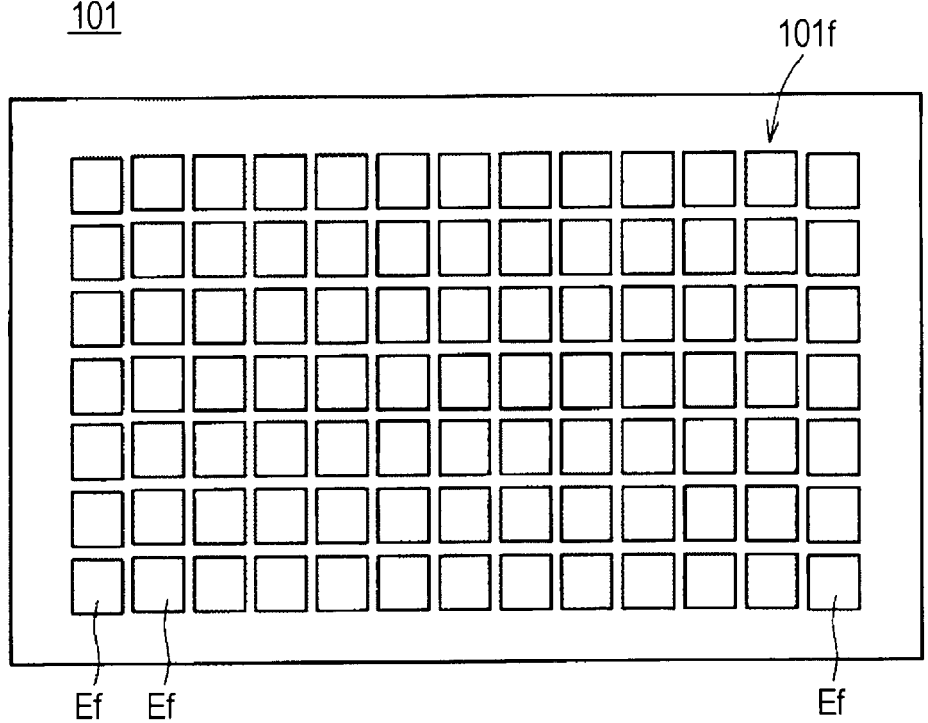
FIG. 6 illustrates an exemplary configuration of an image sensing device.
Figure 7:
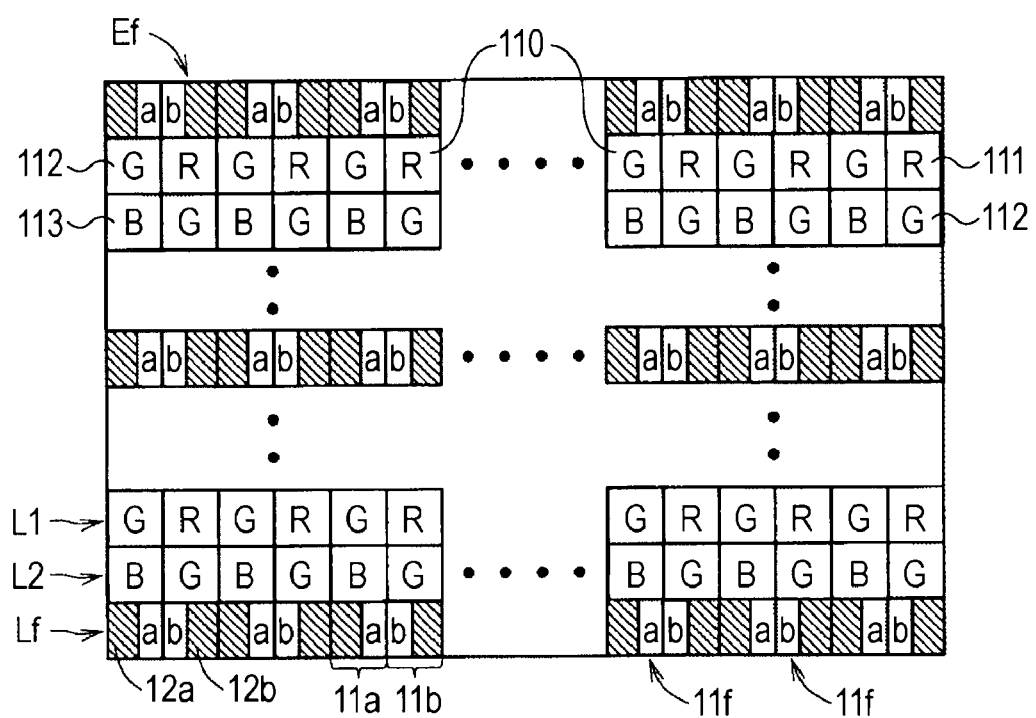
FIG. 7 illustrates an exemplary configuration of an image sensing device.

The image capturing apparatus 1A can perform a phase difference AF by receiving light passed through portions of the lens having different exit pupils using the image sensing device 101. An exemplary configuration of the image sensing device 101 and the principle of the phase difference AF using the image sensing device 101 are first described. FIGS. 6 and 7 illustrate an exemplary configuration of the image sensing device 101.

The image sensing device 101 is configured so that focus detection using a phase difference detection method can be performed for each of the AF areas Ef arranged in an imaging surface 101f of the image sensing device 101 in a matrix (refer to FIG. 6).

Each of the AF areas Ef is provided with ordinary pixels (hereinafter also referred to as "normal pixels") 110 including R pixels 111, G pixels 112, and B pixels 113 having R, G, or B color filters on photodiodes, respectively. The AF area Ef further includes pixels 11f (hereinafter also referred to as "AF pixels") each including a light blocking plate 12a or 12b (indicated by hatchings) (refer to FIG. 7). The pixels 11f (described in more detail below) are used for phase difference AF.

In addition, the AF area Ef includes a plurality of Gr lines L1 each having G pixels 112 and R pixels 111 arranged alternately in the horizontal direction and a plurality of Gb lines L2 each having B pixels 113 and G pixels 112 arranged alternately in the horizontal direction. The Gr lines L1 and the Gb lines L2 serve as horizontal lines for the normal pixels. By alternately arranging the Gr lines L1 and the Gb lines L2 in the vertical direction, the Bayer arrangement is formed.

Furthermore, in the AF area Ef, AF lines Lf each including the AF pixels 11f arranged in the horizontal direction are formed, for example, after every six horizontal lines of the normal pixels. For example, the AF area Ef includes about 20 AF lines Lf.

The principle of phase difference AF using the AF lines Lf is described in detail next.

Figure 8:
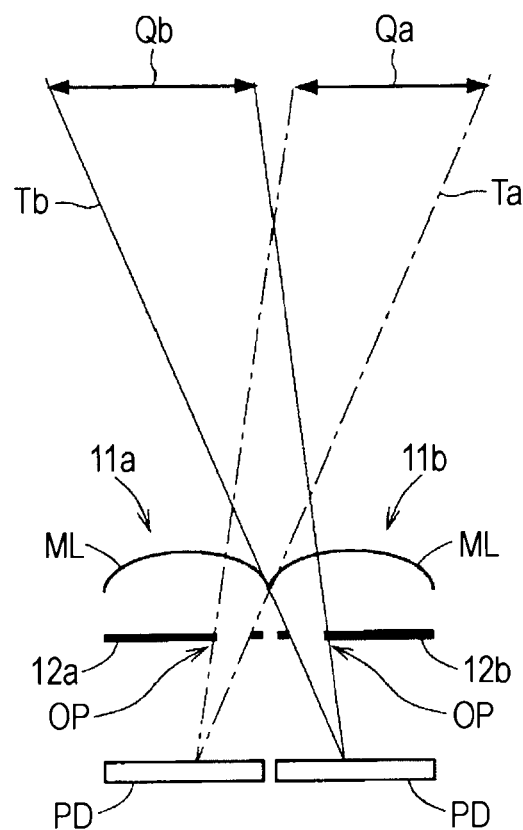
FIG. 8 is a diagram illustrating the principle of phase difference AF using AF lines.

FIG. 8 is a diagram illustrating the principle of phase difference AF using the AF lines Lf.

In each of the AF lines Lf, pairs including a pixel 11a and a pixel 11b are arranged in the horizontal direction. The pixels 11a and 11b include the light blocking plates 12a and 12b, respectively. The pixels 11a and 11b are arranged so that the positions of openings OP for separating a light ray Ta entering from a portion Qa located on the right of the exit pupil for the interchangeable lens 2 from a light ray Qb entering from a portion Qb located on the left are mirror symmetrical. More specifically, the pixel 11a includes the light blocking plate 12a shifted to the right relative to a photoelectric converter (photodiode) PD located immediately beneath the pixel 11a (hereinafter, this pixel is also referred to as a "first AF pixel"). In contrast, the pixel 11b includes the light blocking plate 12b shifted to the left relative to a photoelectric converter PD located immediately beneath the pixel 11b (hereinafter, this pixel is also referred to as a "second AF pixel"). A plurality of the pixels 11a and 11b are alternately arranged in the AF line Lf (refer to FIG. 7).

In this way, the light ray Ta entering from the portion Qa located on the right of the exit pupil passes through a microlens ML and the opening OP of the light blocking plate 12a. Thereafter, the light ray Ta is received by the photoelectric converter PD of the first AF pixel 11a. In contrast, the light ray Tb entering from the portion Qb located on the left of the exit pupil passes through a microlens ML and the opening OP of the light blocking plate 12b. Thereafter, the light ray Tb is received by the photoelectric converter PD of the second AF pixel 11b. That is, in the pair including the pixels 11a and 11b, the pixels 11a and 11b receive the light rays Ta and Tb emitted from the object and passed through the portions Qa and Qb located on the right and left (a pair of portions) of the exit pupil of the interchangeable lens 2, respectively.

Figure 9:
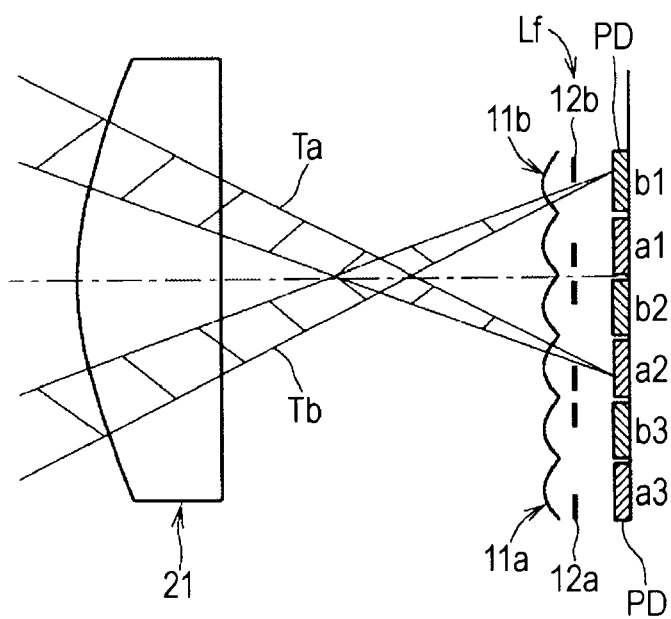
FIG. 9 illustrates a relationship between a light ray made incident from an exit pupil of an image-capturing lens and AF pixels of the image sensing device.
Figure 10:
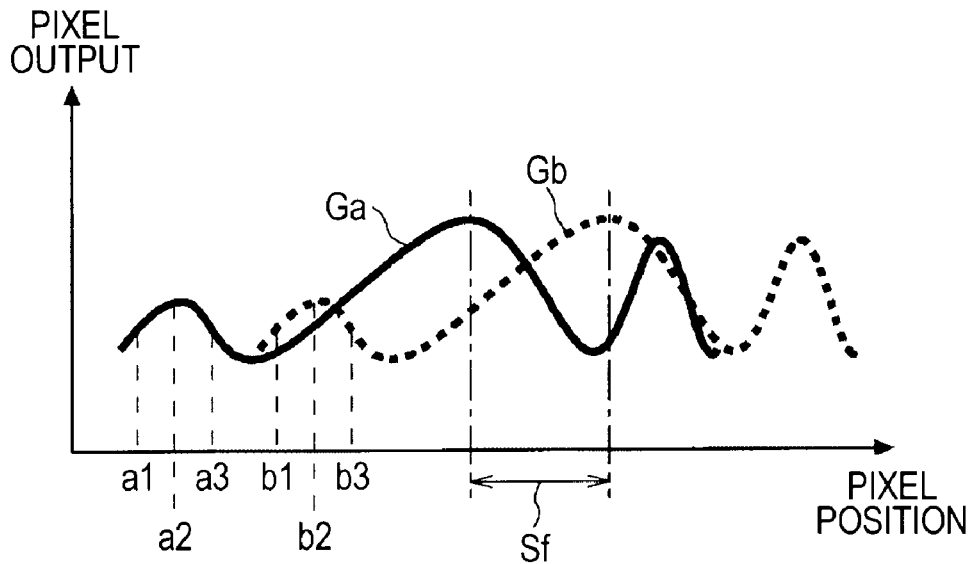
FIG. 10 illustrates a pixel output of the AF line.
Figure 11:
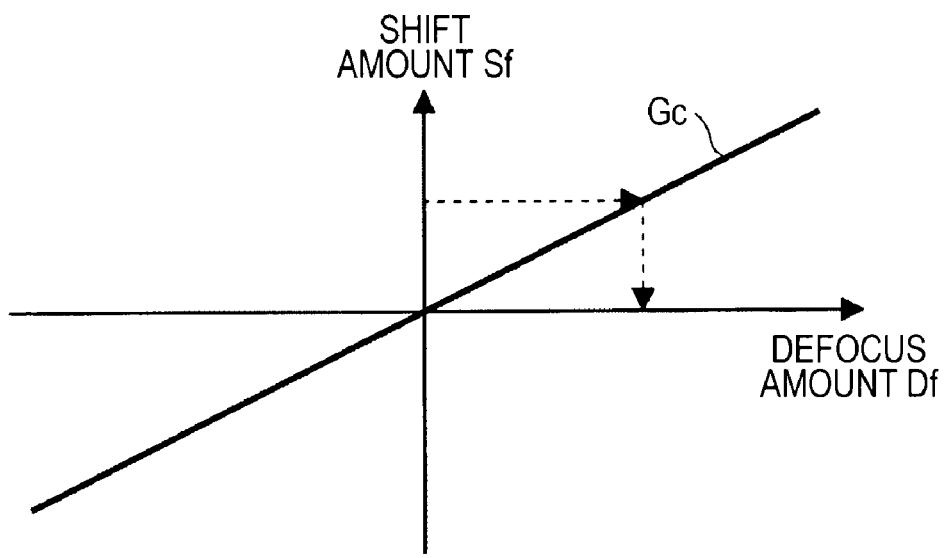
FIG. 11 illustrates a shift amount of the pixel output and a defocus amount.

Hereinafter, a pixel output from the first AF pixel 11a is referred to as a "pixel output of 'a' series", and a pixel output from the second AF pixel 11b is referred to as a "pixel output of 'b' series". For example, a relationship between a pixel output of "a" series and a pixel output of "b" series obtained from the pixel arrangement of the AF pixels 11f arranged in one of the AF lines Lf is described next with reference to FIGS. 9 and 10. FIG. 9 illustrates a relationship between a light ray made incident from an exit pupil of the lens and the AF pixels 11f of the image sensing device 101. FIG. 10 illustrates the pixel output of the AF line Lf. FIG. 11 illustrates a shift amount Sf of the pixel output and a defocus amount Df.

In the AF line Lf, for example, as shown in FIG. 9, the light rays Ta and Tb are received by the first AF pixel 11a and the second AF pixel 11b, respectively. The pixel output of "a" series of the AF line Lf including a-series pixels a1 to a3 arranged as shown in FIG. 9 is indicated by a graph Ga (a solid line) shown in FIG. 10. In contrast, the pixel output of "b" series of the AF line Lf including b-series pixels b1 to b3 arranged as shown in FIG. 9 is indicated by a graph Gb (a dotted line) shown in FIG. 10.

Comparison between the graph Ga and the graph Gb shown in FIG. 10 indicates that the phase of the pixel output of "b" series is different from the phase of the pixel output of "a" series by a shift amount Sf in a direction of the AF line Lf.

On the other hand, a relationship between the shift amount Sf and the defocus amount which is the amount of defocus of the focal plane with respect to the imaging surface of the image sensing device 101 is indicated by a graph of a linear function Gc, as shown in FIG. 11. The slope of the graph Gc can be obtained in advance using a factory test.

Accordingly, the shift amount Sf is obtained by the phase difference AF computation circuit 77 on the basis of the output of the AF line Lf of the image sensing device 101. Subsequently, the phase difference AF control unit 62B computes the defocus amount Df using the graph Gc shown in FIG. 11. The phase difference AF control unit 62B then provides a driving amount corresponding to the computed defocus amount Df to the focus lens 211. Thus, phase difference AF in which the focus lens 211 is moved to the focus position can be performed.

In this way, the image capturing apparatus 1A can perform an automatic focus operation using a phase difference detection method and the output signal output from a light-receiving element incorporated in the imaging surface of the image sensing device 101 (also referred to as a "phase difference AF operation performed by the image sensing device 101").

In addition to the phase difference AF operation performed by the image sensing device 101, the image capturing apparatus 1A can have a phase difference AF function and a contrast AF function performed by the AF module 107. The availability of these AF functions is determined by a selected viewfinder mode.

More specifically, in an OVF mode, the image capturing apparatus 1A enters a mirror lock-down mode (refer to FIG. 3), and therefore, part of the object light is led to the AF module 107. Accordingly, an AF operation using a phase difference detection method and the output signal output from the light-receiving element of the AF module 107 (also referred to as a "phase difference AF operation performed by the AF module 107") can be performed.

In contrast, in an EVF mode, the image capturing apparatus 1A enters a mirror lock-up mode (refer to FIG. 4), and therefore, the object light is led to the image sensing device 101. Accordingly, a phase difference AF operation and/or a contrast AF operation performed by the image sensing device 101 is available. In the EVF mode, which one of the AF operations performed by the image sensing device 101 (a phase difference AF operation and a contrast AF operation) is performed can be determined through a menu selection operation on the menu screen.

Basic Operation of Image Capturing Apparatus 1A

Figure 12:
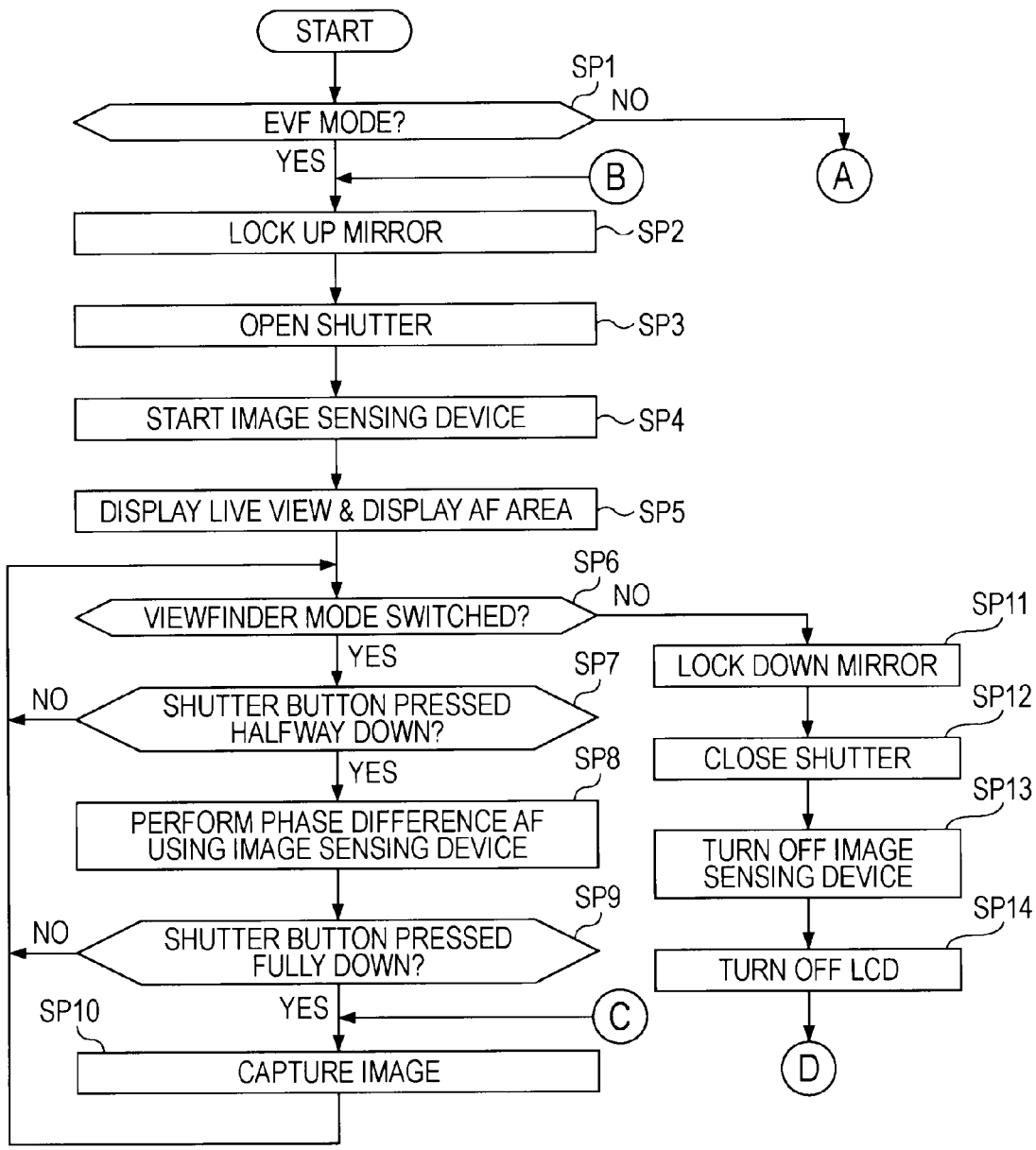
FIG. 12 is a flow chart of an exemplary image capturing operation of the image capturing apparatus.
Figure 13:
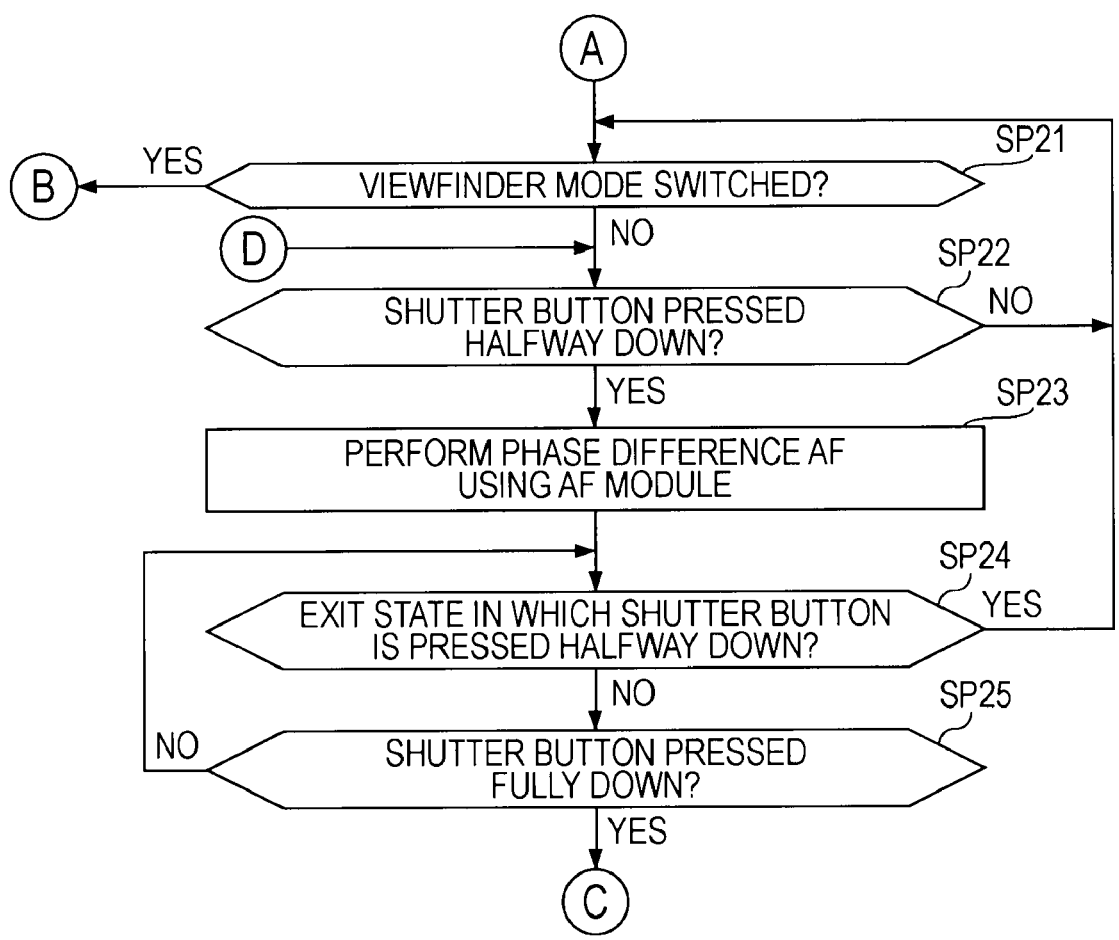
FIG. 13 is a continuation of the flow chart of FIG. 12.
Figure 14:
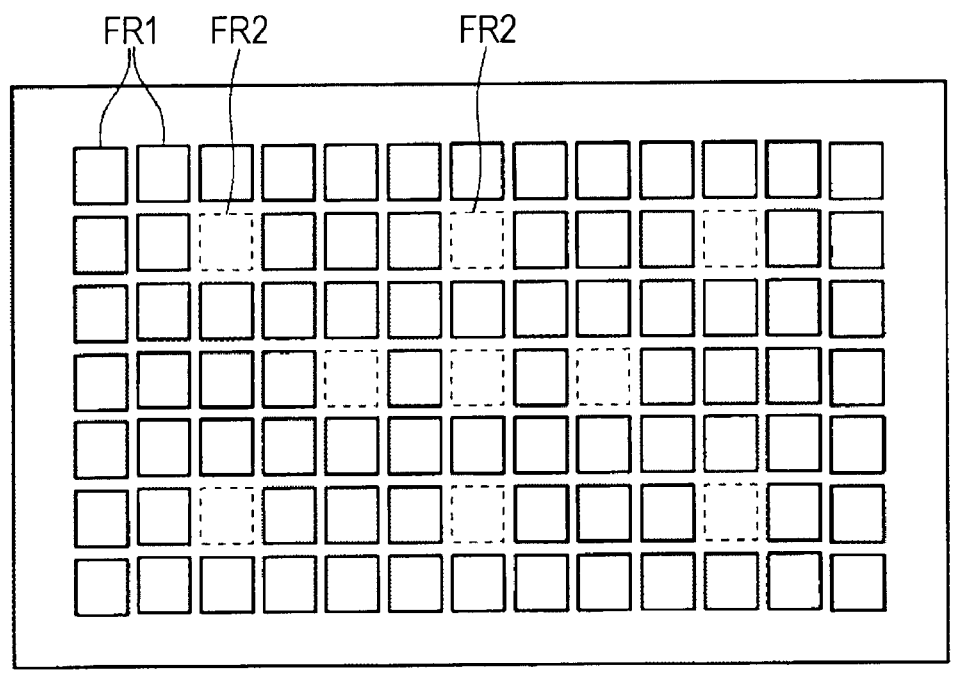
FIG. 14 illustrates an example of display of an AF area on an LCD.
Figure 15:
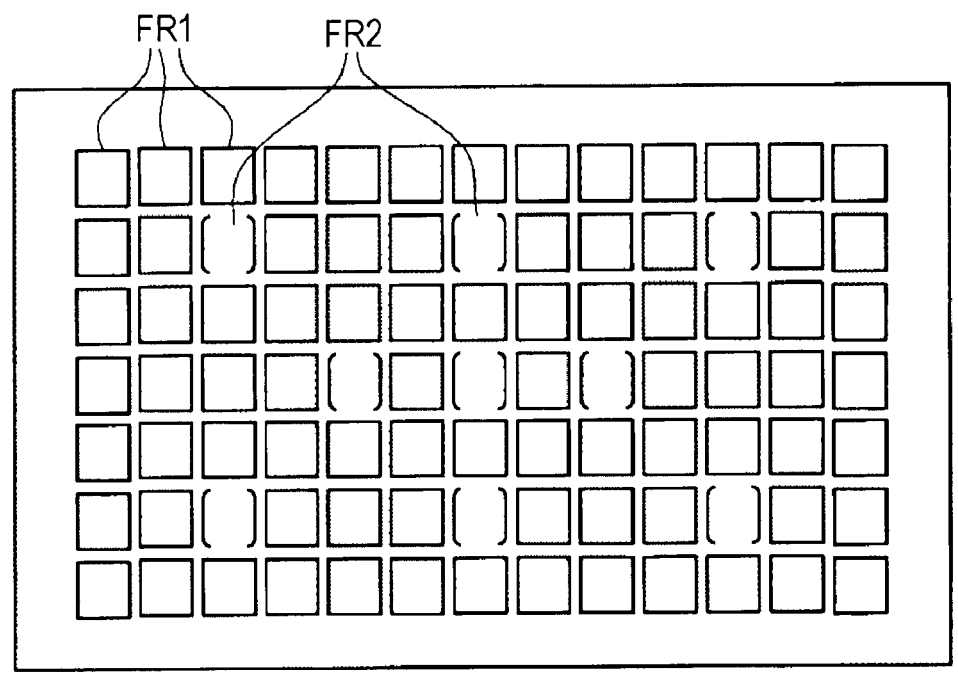
FIG. 15 illustrates an example of display of an AF area on an LCD.

The basic operation of the image capturing apparatus 1A is described next. FIGS. 12 and 13 are flow charts of an exemplary image capturing operation performed by the image capturing apparatus 1A. FIGS. 14 and 15 illustrate an exemplary AF area Ef displayed on the LCD 311.

If a shooting mode is selected through a dial operation using the mode setting dial 305 of the image capturing apparatus 1A, an image capturing operation shown in FIGS. 12 and 13 is carried out.

More specifically, as shown in FIG. 12, in step SP1, it is determined whether an EVF mode has been selected through the operation of the display changeover switch 85. If an EVF mode has not been selected, the processing proceeds to step SP21 (refer to FIG. 13). In step SP21, composition determination operation in an OVF mode is available. Steps subsequent to step SP21 are described below.

However, if an EVF mode has been selected, the processing proceeds to step SP2. In step SP2, composition determination operation in an EVF mode is available.

More specifically, in step SP2, the mirror unit 103 is driven so that the mirror unit 103 is moved away from the optical path of the object light that has passed through the interchangeable lens 2.

In step SP3, the shutter unit 40 enters an open mode. In step SP4, the image sensing device 101 is started. Thus, the image sensing device 101 can be exposed to light and can generate an image signal.

In step SP5, supply of the power to the LCD 311 is started. The display control unit 62A starts displaying of a live view image on the LCD 311 using the image signals sequentially generated by the image sensing device 101.

In addition, the display control unit 62A displays the AF area Ef on the LCD 311. More specifically, as shown in FIG. 14, an AF area (also referred to as an "image AF area") FR1 (a rectangular area indicated by a solid line in FIG. 14) used for an AF operation using the image sensing device 101 is combined with the live view image and is displayed on the LCD 311. In addition, an AF area (also referred to as a "module AF area") FR2 (a rectangular area indicated by a dotted line in FIG. 14) used for an AF operation using the AF module 107 is combined with the live view image and is displayed on the LCD 311.

As noted above, in an EVF mode, by displaying, on the LCD 311, the module AF area FR2 used for a phase difference AF operation performed by the AF module 107, the user can recognize the module AF area FR2 used in an OVF mode even in an EVF mode. In this way, when the user plans to change from an EVF mode to an OVF mode after the user completes a framing operation in an EVF mode, the user can perform the framing operation in an EVF mode so that the object is located in the module AF area FR2. Thus, the user can perform framing without re-aligning the angle of view after changing the mode.

In addition, when displaying the AF areas on the LCD 311, the image AF area FR1 and the module AF area FR2 may have different frame shapes, as shown in FIG. 15. Alternatively, the frames may be displayed in different colors. For example, the frame representing the image AF area FR1 may be displayed in red, while the frame representing the image AF area FR1 may be displayed in blue.

Furthermore, in FIGS. 14 and 15, the module AF area FR2 is displayed on top of the image AF area FR1. Thus, the area displayed as the module AF area FR2 also serves as the image AF area FR1. That is, in FIGS. 14 and 15, the area displayed as the module AF area FR2 is also used for the AF operation using the image sensing device 101.

In step SP6 (refer to FIG. 12), it is determined whether the viewfinder mode has been switched. More specifically, the contact point position of the display changeover switch 85 is detected. If the display changeover switch 85 is set to an OVF mode (the contact point position is "Optical"), the processing proceeds to step SP11. In step SP11, the mode is changed from an EVF mode to an OVF mode (mode transition from an EVF mode to an OVF mode is made). This processing is described in more detail below.

However, if the display changeover switch 85 is set to an EVF mode (the contact point position is "Monitor"), the processing proceeds to step SP7.

In step SP7, it is determined whether the shutter button 307 is pressed halfway down. If the shutter button 307 is not pressed halfway down, the processing proceeds to step SP6, and therefore, the processing is performed in step SP6 again. However, if the shutter button 307 is pressed halfway down, the processing proceeds to step SP8.

In step SP8, the phase difference AF operation is performed by the image sensing device 101.

In step SP9, it is determined whether the shutter button 307 is pressed fully down. If the shutter button 307 is not pressed fully down, the processing proceeds to step SP6, and therefore, the processing is performed in step SP6 again. However, if the shutter button 307 is pressed fully down, the processing proceeds to step SP10.

In step SP10, an image capturing operation (exposure) is performed. More specifically, the image capturing apparatus 1A enters a mirror lock-up mode in which the object light is made incident on the image sensing device 101, and an exposure operation performed by the image sensing device 101 is started. Thereafter, predetermined image processing is performed on an image signal acquired by the image sensing device 101. The image signal is then stored in, for example, the memory card 67.

After the processing performed in step SP10 is completed, the processing proceeds to step SP6, and therefore, the processing is performed in step SP6 again.

The processing performed when it is determined in step SP6 (refer to FIG. 12) that the display changeover switch 85 is set to an OVF mode is described next.

In such a case, the processing proceeds to step SP11. In step SP11, the viewfinder mode is changed to an OVF mode (mode transition to an OVF mode is made).

More specifically, in step SP11, the mirror unit 103 is driven so as to enter a mirror lock-down mode in which the mirror unit 103 is disposed in the optical path of the object light.

In step SP12, the shutter unit 40 enters a closed state. In step SP13, the operation of the image sensing device 101 is stopped. In step SP14, the LCD 311 is turned off, and the processing proceeds to step SP22 (refer to FIG. 13).

After the processing proceeds to step SP22, if no operations are performed on the shutter button 307 and transition in the viewfinder mode is detected (step SP21), the processing proceeds to step SP2. In step SP2, the mode transition from an OVF mode to an EVF mode occurs (this is described below).

As described above, in an EVF mode, a live view image is displayed on the LCD 311 on the basis of the image signals sequentially generated by the image sensing device 101. In addition, the AF area Ef is displayed on the LCD 311. As the AF area Ef, the image AF area FR1 used for an AF operation using the image sensing device 101 and the module AF area FR2 used for a phase difference AF operation performed by the AF module 107 are displayed.

The case where it is determined in step SP1 that an EVF mode is not selected through the operation using the display changeover switch 85 (an OVF mode is selected) and the processing proceeds to step SP21 (refer to FIG. 13) is described next.

In such a case, in step SP21, like step SP6 described above, the contact point position of the display changeover switch 85 is detected first. Thus, it is determined whether the viewfinder mode has been switched. If the contact point position is set to an OVF mode (the contact point position is "Optical"), it is determined that the viewfinder mode has not been switched, and the processing proceeds to step SP22. However, if the contact point position is set to an EVF mode (the contact point position is "Monitor"), the processing proceeds to step SP2.

In step SP22, like step SP7 described above, it is detected whether the shutter button 307 is pressed halfway down. If it is not detected that the shutter button 307 is pressed halfway down, the processing proceeds to step SP21, and the processing is performed in step SP21 again. However, if it is detected that the shutter button 307 is pressed halfway down, the processing proceeds to step SP23.

In step SP23, the phase difference AF operation is performed by the AF module 107.

In step SP24, it is determined whether the shutter button 307 exits the state in which the shutter button 307 is pressed halfway down. If it is determined that the shutter button 307 exits the state in which the shutter button 307 is pressed halfway down, the processing proceeds to step SP21, and the processing in step SP21 is performed again. However, if it is determined that the shutter button 307 does not exit the state in which the shutter button 307 is pressed halfway down, the processing proceeds to step SP25.

In step SP25, like step SP9 described above, it is determined whether the shutter button 307 is pressed fully down. If the shutter button 307 is not pressed fully down, the processing proceeds to step SP24, and the processing in step SP24 is performed again. However, if it is detected that the shutter button 307 is pressed fully down, the processing proceeds to step SP10 described above, where an image capturing operation is performed.

As described above, the image capturing apparatus 1A combines the module AF area FR2 used for a phase difference AF operation performed by the AF module 107 using a ranging sensor with a preview image and displays the image. Accordingly, when AF control based on a phase difference detection method is performed after the preview image is displayed, realignment of the angle of view is not necessary.

Second Embodiment

Figure 16:
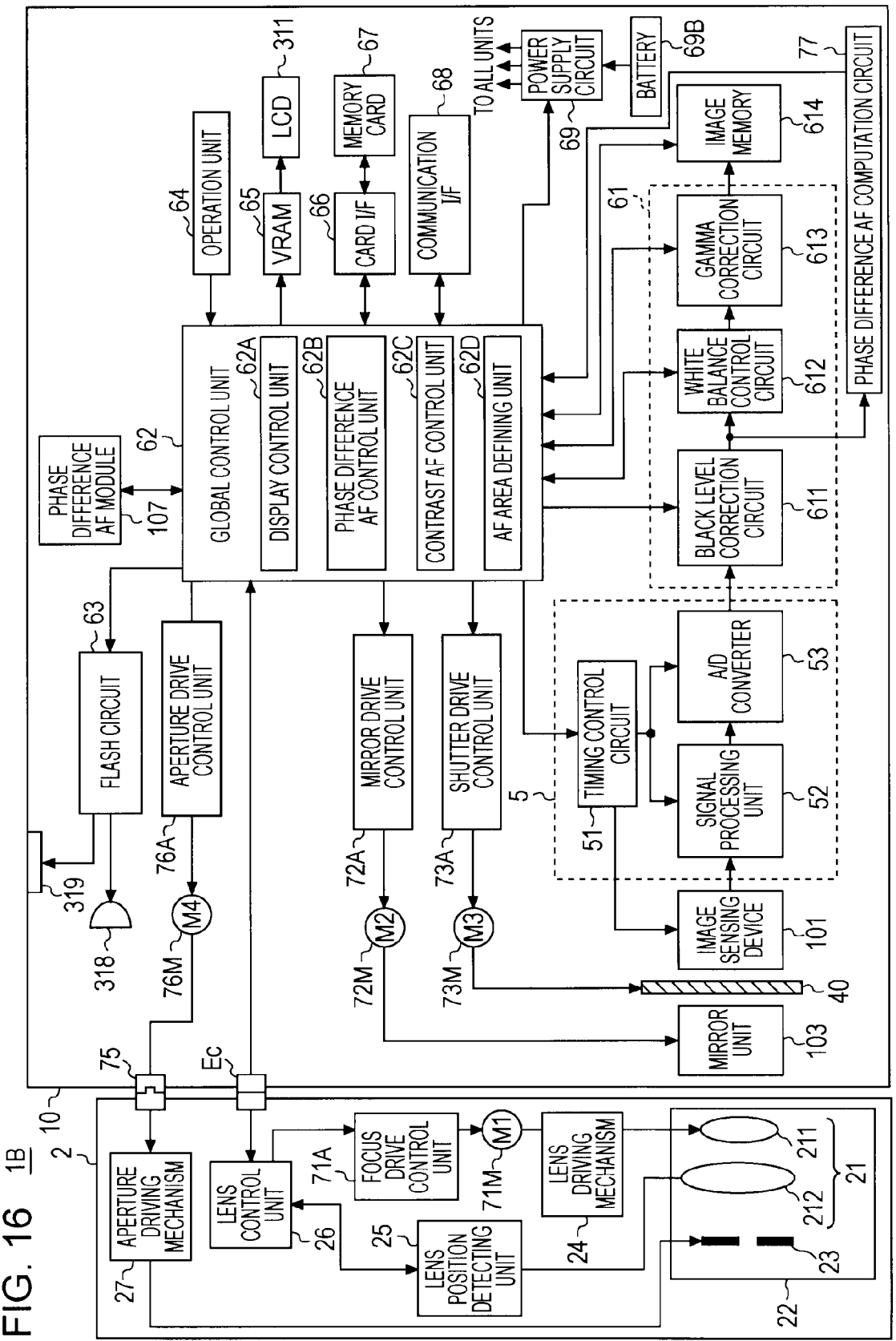
FIG. 16 is a block diagram of an exemplary electrical configuration of an image capturing apparatus according to a second embodiment of the present invention.
Figure 17:
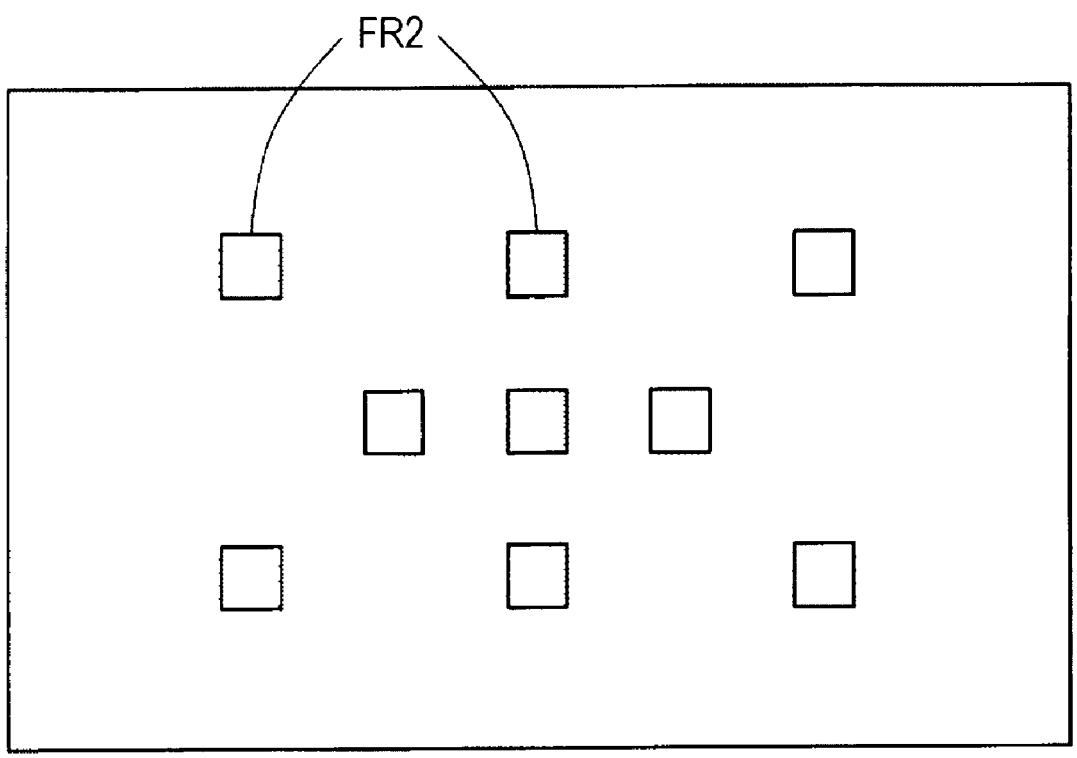
FIG. 17 illustrates an example of display of an AF area on an LCD.

A second embodiment of the present invention is described next. According to the second embodiment, an image capturing apparatus 1B realizes the function of an AF area defining unit 62D in the global control unit 62. Thus, the image capturing apparatus 1B allows the image AF area FR1 and the module AF area FR2 to be shared in accordance with user setting. FIG. 16 is a block diagram of an exemplary electrical configuration of the image capturing apparatus 1B. FIG. 17 illustrates an exemplary AF area displayed on the LCD 311.

The image capturing apparatus 1B of the second embodiment has a similar configuration and features to those of the image capturing apparatus 1A of the first embodiment (refer to FIGS. 1 to 4 and FIG. 16). Accordingly, similar numbering will be used in describing the image capturing apparatus 1B as was utilized above in describing the image capturing apparatus 1A, and the descriptions are not repeated.

As shown in FIG. 16, the global control unit 62 of the image capturing apparatus 1B realizes the functions of the display control unit 62A, the phase difference AF control unit 62B, the contrast AF control unit 62C, and the AF area defining unit 62D by means of programs.

The AF area defining unit 62D performs control so that focusing information used for the phase difference AF operation or the contrast AF operation performed by the image sensing device 101 can be acquired from the module AF area FR2 used for the phase difference AF operation performed by the AF module 107. That is, the AF area defining unit 62D defines the image AF area FR1 as being an area indicated by the module AF area FR2 in the image sensing device 101. This area is also referred to as a "corresponding area". Thus, these AF areas become a shared area.

Note that when the module AF area FR2 and the image AF area FR1 become a shared area by the AF area defining unit 62D, the module AF area FR2 capable of being used for the phase difference AF operation performed by the AF module 107 is displayed on the LCD 311, as shown in FIG. 17 (step SP5 shown in FIG. 12).

In addition, whether the AF areas become a shared area can be determined through a menu operation of a menu screen displayed on the LCD 311.

As described above, in addition to the configuration of the image capturing apparatus 1A, the image capturing apparatus 1B includes the AF area defining unit 62D that defines the image AF area FR1 in the corresponding area indicated by the module AF area FR2 in the image sensing device 101. In this way, the image AF area FR1 used in an EVF mode can be shared with the module AF area FR2 used in an OVF mode. Accordingly, the user can perform framing without being bothered by a positional shift between the AF areas in the different viewfinder modes.

Third Embodiment

A third embodiment of the present invention is described next. In the image capturing apparatus 1A according to the first embodiment, when a live view is displayed (refer to step SP5 shown in FIG. 12), the image AF area FR1 and the module AF area FR2 are displayed on the LCD 311 at the same time. However, in an image capturing apparatus 1C according to the third embodiment, a display mode for displaying the AF area on the LCD 311 can be changed in accordance with the user setting.

The image capturing apparatus 1C according to the third embodiment has a configuration and features similar to those of the image capturing apparatus 1A of the first embodiment (refer to FIGS. 1 to 5) except for a function of the display control unit 62A for changing a display mode.

Figure 18:
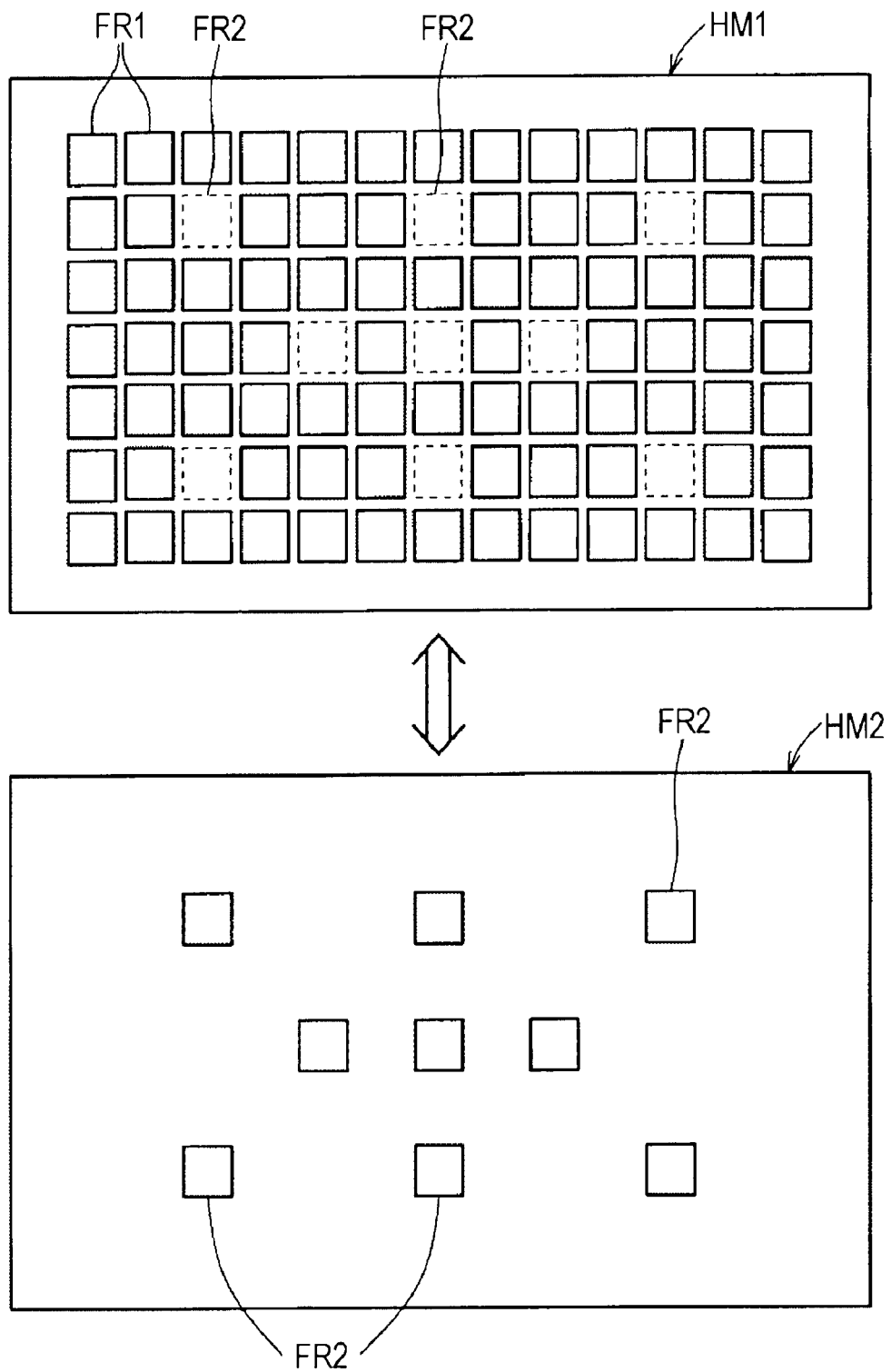
FIG. 18 illustrates a method for displaying the AF area on the LCD.

As described above, the display control unit 62A of the image capturing apparatus 1C has a function of changing a method for displaying the AF area on the LCD 311 (a display mode change function for the AF area) when displaying a live view in accordance with the operation performed by the user (more specifically, a menu operation or an operation using operation members, such as buttons, provided on the image capturing apparatus 1C). FIG. 18 illustrates a method for changing the AF area displayed on the LCD 311.

More specifically, as shown in FIG. 18, in the image capturing apparatus 1C, the user can selectively enable the following two modes: a display mode HM1 in which the image AF areas FR1 and the module AF areas FR2 are displayed on the LCD 311 at the same time and a display mode HM2 in which the image AF areas FR1 are made invisible and only the module AF areas FR2 are displayed on the LCD 311.

In this way, according to the image capturing apparatus 1C having a display mode change function, the user can select the display mode of the AF area in accordance with their preference when displaying a live view.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing device, comprising:
    a mirror unit disposed on an optical axis of object light made incident from an imaging optical system corresponding to a first position of the mirror unit when the image capturing apparatus is in an optical viewfinder (OVF) mode;
    a phase difference detection unit configured to receive the object light having an optical path changed by the mirror unit using a ranging sensor and generate a phase difference detection signal;
    a first focusing unit configured to perform a first focusing operation on a first area on the basis of the phase difference detection signal;
    a controller configured to move the mirror unit away from the optical path corresponding to a second position of the mirror unit when the image capturing apparatus is in an electronic viewfinder (EVF) mode;
    an image sensing device configured to receive object light made incident from the imaging optical system and generate an image signal relating to an object image when the mirror unit is moved into the second position;
    a second focusing unit configured to perform a second phase difference focusing operation on the basis of an output signal acquired from a second area defined in the image sensing device; and
    a processor configured to control the electronic viewfinder to simultaneously display a preview image on the basis of a plurality of image signals sequentially generated by the image sensing device, the first area for which phase difference detection is performed using the ranging sensor, and the second area for which phase difference detection is performed based on an output signal of the image sensing device.

2. The image capturing device of claim 1, wherein the image sensing device includes a light receiving element for detecting a phase difference on an imaging surface and the output signal is a signal output from the light-receiving element.

3. An image capturing device, comprising:
    a mirror unit disposed on an optical axis of object light made incident from an imaging optical system corresponding to a first position of the mirror unit when the image capturing apparatus is in an optical viewfinder (OVF) mode;
    means for receiving the object light having an optical path changed by the mirror unit using a ranging sensor and for generating a phase difference detection signal;
    means for performing a first focusing operation on a first area on the basis of the phase difference detection signal;
    means for moving the mirror unit away from the optical path corresponding to a second position of the mirror unit when the image capturing apparatus is in an electronic viewfinder (EVF) mode;
    means for receiving object light made incident from the imaging optical system and for generating an image signal relating to an object image when the mirror unit is moved into the second position;
    means for performing a second phase difference focusing operation on the basis of an output signal acquired from a second area defined in the means for receiving object light; and
    means for controlling the electronic viewfinder to simultaneously display a preview image on the basis of a plurality of image signals sequentially generated by the means for receiving object light, the first area for which phase difference detection is performed using the ranging sensor, and the second area for which the second phase difference focusing operation is performed.

* * * * *